US007083663B2

(12) United States Patent
Shih et al.

(10) Patent No.: US 7,083,663 B2
(45) Date of Patent: Aug. 1, 2006

(54) ACTIVE FILTRATION OF AIRBORNE CONTAMINANTS EMPLOYING HEATED POROUS RESISTANCE-HEATED FILTERS

(75) Inventors: Albert J. Shih, Ann Arbor, MI (US); Edward J. Cookson, Hendersonville, NC (US)

(73) Assignee: The Regents of the University of Michigan, Ann Arbor, MI (US)

(*) Notice: Subject to any disclaimer, the term of this patent is extended or adjusted under 35 U.S.C. 154(b) by 242 days.

(21) Appl. No.: 10/696,790

(22) Filed: Oct. 30, 2003

(65) Prior Publication Data

US 2005/0092181 A1 May 5, 2005

(51) Int. Cl.
*B01D 46/00* (2006.01)

(52) U.S. Cl. ........................ 95/283; 95/287; 55/385.1; 55/482.1; 55/485; 55/495; 55/523; 55/525; 55/529; 96/223; 96/225; 422/4; 422/22

(58) Field of Classification Search ............... 55/282.1, 55/282.2, 282.3, 282.4, 282.5, 385.1, 385.3, 55/482, 483, 484, 485, 490, 490.1, 490.2, 55/495, 502, 503, 522, 523, 525, 529, DIG. 10, 55/DIG. 30, 482.1; 95/278, 283, 286, 287; 96/223, 225; 422/4, 22, 174, 180; 60/273, 60/282, 297, 300, 303, 311
See application file for complete search history.

(56) References Cited

U.S. PATENT DOCUMENTS 4,422,369 A * 12/1983 Smets ....................... 55/385.3
4,661,126 A * 4/1987 Inagami et al. ............... 95/283
5,238,472 A * 8/1993 Pfister et al. ............. 55/282.3
5,405,422 A * 4/1995 Ueda et al. ................ 55/282.3
5,423,904 A * 6/1995 Dasgupta ..................... 55/523
5,482,538 A * 1/1996 Becker et al. ................ 95/283
5,557,923 A * 9/1996 Bolt et al. ............ 55/DIG. 30
5,569,455 A * 10/1996 Fukui et al. ................ 422/174
5,695,549 A * 12/1997 Feldman et al. ............... 96/55
6,080,219 A * 6/2000 Jha et al. ...................... 55/523
6,432,168 B1 * 8/2002 Schonauer ................. 55/282.3
6,878,192 B1 * 4/2005 Pasic ............................ 96/66
2001/0029004 A1 * 10/2001 Sparling et al. ............ 431/326

OTHER PUBLICATIONS

Barnhart, J., "Manufacture, Characterization and Application of Cellular Metals and Metal Foams," Progress in Material Science, v. 46, pp. 559-632 (2001).
Lu, T.J. et al., "Heat Transfer in Open-Cell Metal Foams," Acta Materiala, v. 36, pp. 3619-3635 (1998).
Kanthal Handbook—Heating Alloys For Electrical Household Appliances, Kanthal AB, Sweden, 2001.

(Continued)

*Primary Examiner*—Jason M. Greene
(74) *Attorney, Agent, or Firm*—Brooks Kushman P.C.

(57) ABSTRACT

Filter devices, suitable for rendering pathogenic microorganisms non-viable and capable of regeneration to serve as filter devices for applications such as diesel engines where combustible particulates are trapped, include at least one porous filter element which is capable of electrically resistive heating to a temperature such that pathogens are rendered non-viable, and/or to a regeneration temperature such that combustible particulates are destroyed.

16 Claims, 5 Drawing Sheets

OTHER PUBLICATIONS

Blacker, T., "The Cooper tool," 5th International Meshing Roundtable, Sandia National Laboratories, pp. 13-30 (1996).
Floyd, D., "Fluid Properties of Open Cell Sintered Iron Based Porous Metal Structures, Experimental Results and Discussion," Porvair Fuel Cell Technical Report (2001).
Calmidi, V.V. et al., "Forced Convection in High Porosity Metal Foams," Journal of Heat Transfer, vol. 122, pp. 557-565 (2000).
Hwang, J.J. et al., "Measurement of Intersititial Convective Heat Transfer and Frictional Drag for Flow Across Metal Foams," Journal of Heat Transfer, vol. 124, pp. 120-129 (2002).
Qu, J. et al., "Development of the Cylindrical Wire Electrical Discharge Machining Proces: Part I: Concept, Design, and Material Removal Rate," ASME Journal of Manufacturing Science and Engineering, vol. 124, No. 3, pp. 702-707 (2002).

* cited by examiner

Fig. 1
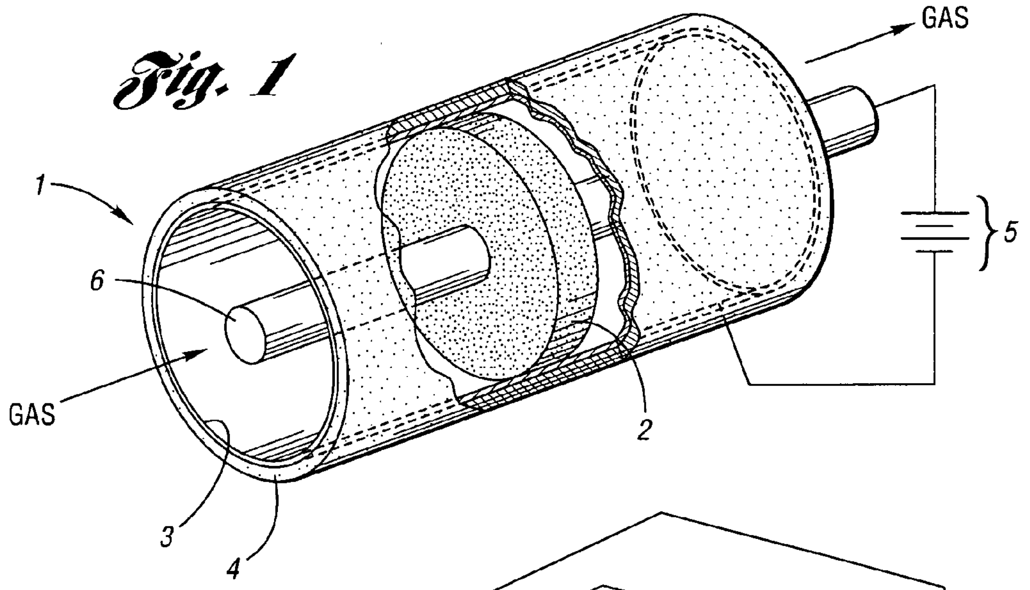
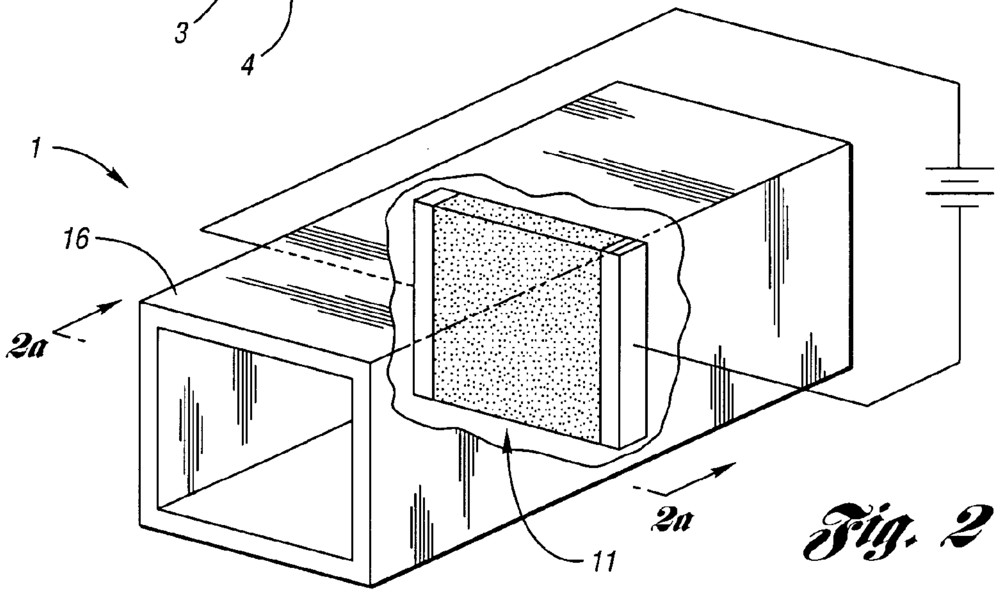
Fig. 2
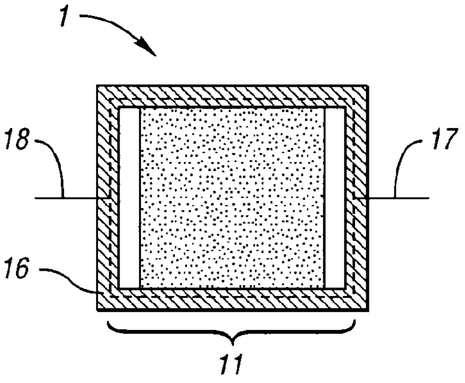
Fig. 2a
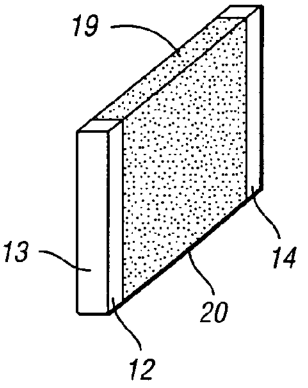
Fig. 2b

ACTIVE FILTRATION OF AIRBORNE CONTAMINANTS EMPLOYING HEATED POROUS RESISTANCE-HEATED FILTERS

BACKGROUND OF THE INVENTION

1. Field of the Invention

The present invention pertains to the filtration of gas streams to remove contaminants therefrom, particularly pathogens.

2. Background Art

Filtration of gas streams, particularly air streams, is a well developed technology. In the home, for example, a variety of filters, including electrostatic precipitators, are used to remove dust, microorganisms, and particulates from forced air HVAC systems. Such systems still allow large numbers of particulates to be circulated in the air stream, however, and in more stringent environments, including chemical and biological laboratories, hospitals, chemical plants, and the like, large surface area, e.g. pleated, filters with very small pore size are utilized in order to trap the majority of particulates. However, flow velocity is limited, and flow volume, in order to be large, is associated with very large filter surface area.

However, in many environments, mere trapping of particulates is not enough. First, in some applications, particularly those involving infectious microorganisms, "zero tolerance" is the desired standard for viability of any microorganisms which may pass through filtration systems. Elimination of all particulates would involve filtration systems of such small pore size and hence large surface area that such filtration is not economically feasible. Second, the filters used in such applications must be disposed of in an environmentally responsive manner. For example, filters which may contain pathogens, toxins, or carcinogens must generally be incinerated at high temperatures.

Heated gas has been used to destroy gas-borne contaminants or to render pathogens non-viable. However, such systems employ external heat sources, i.e. heated tubes or ducts, internal resistance wire heating elements, or actual incineration in fuel-fed flames, which is obviously impractical for many uses. Tubes containing heated filaments of resistance wire have the drawback that the temperature must be kept very high, particularly at high gas velocities, since impingement of particles directly onto a heated filament is no more than a random event, and many particulates can otherwise pass through such devices without experiencing a high enough temperature for deactivation. Such systems also do not trap particulates to any substantial degree, and thus must be combined with filter elements for these purposes.

Numerous filtration media have been developed over the years, including porous and optionally chemically treated paper; fiberglass, including fiberglass coated with bioactive metals such as silver; microporous polymer films, for example those of nylon and polysulfone; open celled polymeric foams; sintered metals, ceramics, and glass, e.g. glass "frits," and foamed metals and ceramics.

It would be desirable to provide a filtration system which is capable of rendering pathogenic particulates non-viable in addition to providing filtration per se. It would further be desirable to provide a filtration system where the flow rate can be maintained at high values. It would be yet further desirable to provide a filtration system which is regenerable, i.e. which does not rely on disposable filter elements.

SUMMARY OF THE INVENTION

Electric resistance heated porous conductive filters trap particulates from gas streams and are capable of deactivating and/or destroying particulates as well, in particular rendering pathogens non-viable. The filters may be regenerated by increasing their temperature to incinerate trapped particles.

BRIEF DESCRIPTION OF THE DRAWINGS

FIG. 1 illustrates one embodiment of a filter device of the subject invention;

FIGS. 2, 2*a* and 2*b* illustrate a further embodiment of a filter device of the subject invention;

DETAILED DESCRIPTION OF THE PREFERRED EMBODIMENT(S)

Figure 3:
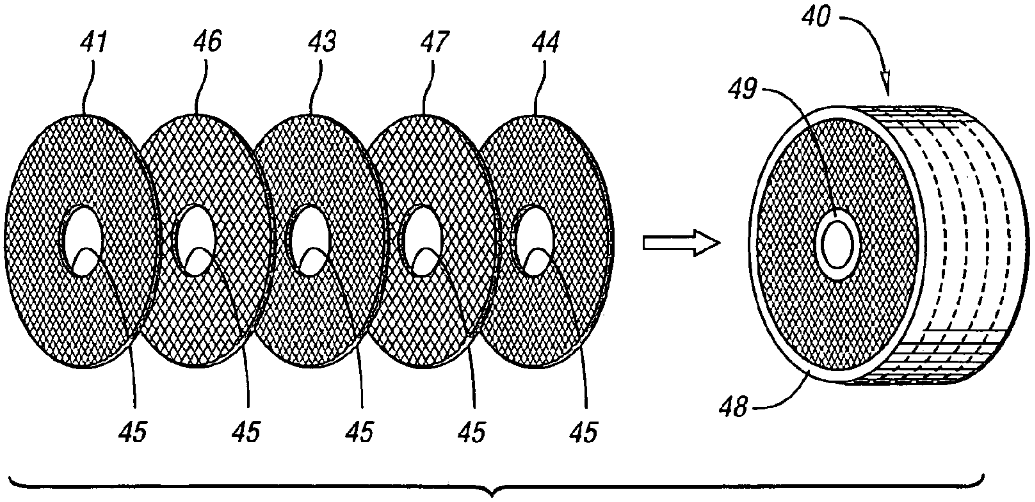
FIG. 3 illustrates a further, multi-element filter device with porous metal filters of relatively constant resistivity in plan.

In the present invention, one or more resistance heated porous filters are positioned in a flow of gas. The filters trap particulates and render trapped biological organisms non-viable. In addition, the gas stream, due to the confined passageways through the filter, may be heated to such an extent that even pathogens which pass through the filter are rendered non-viable. The filter itself need not necessarily be heated to extremely high temperatures to obtain the desired effect, and thus is far more long lasting than resistance wire, while placing less thermal stress on construction components. Moreover, due to the lower temperature of the filter element as compared to heated resistance wire, even gas streams containing combustible gases or dispersed flammable liquids may be safely treated under proper conditions.

By "particulates" is meant substances which are not gases. Particulates may be solid or liquid particles dispersed in the gas stream, and includes, particularly, pathogenic particles such as viable viruses, bacteria, mold, yeast, fungi, and peptides, oligopeptides, DNA, RNA, etc., which exhibit biological activity, including various biotoxins, and the like. Among pathogens whose removal or deactivation are particularly importance, are those causing anthrax, SARS, smallpox, pneumonia, tuberculosis, and ebola, and other highly infectious microorganisms. Of course, the filter devices may also be used to destroy gaseous contaminates such as solvent vapors, hydrocarbon emissions, etc., particularly when such are contained in an oxidizing air stream. In such cases, the temperature of the filter elements is set relatively high, i.e. in the range of 300–1200° C., more preferably 400° C. to 800° C. For pathogens, denaturing or other bioreactions which render such pathogens inactive generally take place at lower temperatures, for example 60° C. to 200° C., preferably 100° C. to 150° C. Successful deactivation which renders pathogens non-viable can be assessed by simple bioassays of exit gas.

The filter elements are porous elements which are conductive but which possess an electrical resistivity such that the material of construction may be heated resistively by flow of electric current. Materials of construction thus typically exclude metals of high conductivity such as silver, unless present in relatively low amounts such as a coating or plating, and likewise typically exclude dielectric materials of very high resistance such as silica, alumina, etc. The commonly used electric resistance heating materials may be successfully used. These include iron-based alloys such as Fe—Cr—Al, e.g. Fecraloy™ or Kanthal™, nickel-based alloys such as Ni—Cr, carbon-based products, cermets such as $MoSi_2$, silicon carbide, tungsten, molybdenum, and platinum. Reference may be had to T. Hegban, INTEGRATING ELECTRICAL HEATING ELEMENTS IN APPLIANCE DESIGN, Marcel Dekker, N.Y. 1997; and C. J. Erickson, HANDBOOK OF ELECTRICAL HEATING FOR INDUSTRY, IEEE Press (1995), the relevant disclosures of which are hereby incorporated by reference.

It should be noted that even dielectric materials and high conductivity materials can be used in the proper circumstances, although the latter are not preferred due to their high current consumption. Ceramic materials are increasingly used for heating elements, for example. The material of the filter elements is thus best described as "conductive," although it may also be described as "resistive," in other words, the degree of conductivity at the operating temperature must be such as to enable resistive electrical heating.

The physical form of the porous filter element is not particularly limited, and may be any form of the desired porosity and pore size which can be resistively heated to the desired degree. For example, the filter element may comprise a plurality of stacked mesh of a desired pore size, i.e. mesh size; may consist of sintered particles; or, preferably, may consist of a foamed article, preferably a metal foam.

The preferred foamed articles may be constructed by techniques known in the art. For example, a porous polymer foam such as an open celled polyurethane foam may be plated or coated with a dispersion of metal powder containing a binder, and fired at high temperature, under which conditions the polymer foam melts, vaporizes, is combusted, or is otherwise thermolytically destroyed. Some polymer or its degradation products, particularly carboniferous residues, may remain in the filter, for example surrounded by metal walls or filaments. Alternatively, a mixture of metal or ceramic powder or ceramic precursor may be mixed with particles of a fugitive pore former such as polymer beads, microcapsules, wood fibers or dust, etc., generally with an organic binder and pressed to form a green body which is then fired to eliminate the pore former. Reference may be had, for example, to M. Ashby, et al., METAL FOAMS—A DESIGN GUIDE, Butterworth-Heinemann (2000); J. Banhart, "Manufacture, Characterization and Application of Cellular Metals and Metal Foams," PROGRESS IN MATERIAL SCIENCE, v. 46, pp. 559–632 (2001); and T. J. Lu, et al., "Heat Transfer in Open-Cell Metal Foams," ACTA MATERIALA, v. 36, pp. 3619–3635 (1998).

The pore size of the foamed filter elements is generally related to flow rate (porosity), however, the latter is also dependent upon the openness or degree of interconnection of the pores throughout the thickness of the filter element. Thus, pore size alone is insufficient to quantify flow rate, although pore size will determine at least to a first approximation, the minimal size of particulates which can be removed from a gas stream. With regard to the latter, the minimum particle size which can be removed is generally smaller than the average pore size and even the maximum pore size, due to the labyrinthal nature of the interconnected pores. Higher pore sizes, all other factors being constant, generally translate into higher flow rates and lesser removal of small particulates, and the reverse is also true. Preferred average pore sizes range from 20 pores per inch to 400 pores per inch, more preferably from 40 pores per inch to 200 pores per inch, and most preferably from 50 pores per inch to 150 pores per inch.

Presently preferred metal foams are Fe—Cr—Al foams having pore sizes of 80 pores per inch and 100 pores per inch, corresponding to average cell sizes (pores) of 0.5 to 0.7 mm and 0.4 to 0.6 mm, respectively, and at two densities each, 5% and 15% relative to fully dense alloy. The fully dense alloy has an electrical resistivity of 1.4 μΩm (KANTHAL HANDBOOK—HEATING ALLOYS FOR ELECTRICAL HOUSEHOLD APPLIANCES, Kanthal AB, Sweden, 2001), in comparison to copper (generally unsuitable), 0.017 μΩm, and stainless steel, 0.74 μΩm. Due to preparation of the foams from sintered metal, and the fineness of the "struts" or "filaments" of the foam, the foam resistivity is much higher, and will vary with density. The electrical resistivities of the foams described above are set forth in Table 1 below.

TABLE 1

| | Weight density: | |
|---|---|---|
| | 5% | 15% |
| Porosity: | Electrical Resistivity, μΩm | |
| 80 ppi | 108 | 39 |
| 100 ppi | 99.6 | 25 |

Thus, the electrical resistivity of Fe—Cr—Al foam is much higher than the bulk alloy, ca. 20 times higher at 15% density, and 70 times higher at 5% density. The higher resistivity of the lower density foam can generate more heat per unit volume of filter element than the more dense foam. Regardless of the type of foam filter element, low pore size and low density are preferred, the former for filtration efficiency, the latter for thermoelectric efficiency.

In a less preferred embodiment, sintered metal filter elements may be used. Such elements have, in general, smaller pores as well as larger contact surfaces between metal particles. The former lowers the size of particulates which may be trapped by the filter, but reduces gas flow as well. Thus, such filters are preferred for high filtration but low gas flow applications. Sintering in conjunction with a pore former will increase minimum filtered particle size and increase flow rate. Such filters, sintered in the presence of a pore former, are more preferred than more highly dense sintered products. Preferred mean pore sizes, densities, etc., are substantially the same as for the metal foam filter elements. In more highly dense sintered filter elements, the increased contact area between sintered particles will ordinarily create more extensive current flow area, thus desirably involving materials, e.g. cermets, silicon carbide, etc., of higher intrinsic resistance in order that the overall resistance of the element is not too low for efficient resistive heating. Mixtures of metal particles and cermets, etc., may be used to provide materials with a wide range of resistivity.

In a less preferred embodiment, screens or mesh ("mesh screens") of electrically heated resistive materials are prepared in a stack including a plurality of such screens, typically offset in a random or quasi-random manner to provide a torturous path. Due to the continuity of strands of material across the screen, the strand diameter should be small in order that sufficient resistance be maintained. Thus, the screens, in addition to conventional woven screens, may comprise perforated plates where the hole size is large as compared to the remaining portions of the device. Moreover, it may be prudent to coat at least the contact surfaces of the strands (e.g. wires) of abutting layers with a dielectric material so that additional conductive paths between, as opposed to within, the screens are not provided. Alternatively, the screens, when made of metal alloy such as Fe—Cr—Al or Ni—Cr, may be sandwiched between further screens of more resistive or even dielectric material. Such screens may constitute woven or non-woven glass or quartz fibers, carbon (graphite) fibers, ceramic fibers, Teflon fibers, etc. If regeneration by resistive heating is performed, the interleaving screens, perforated plates, etc., should be sufficiently heat resistant to withstand the temperatures involved. The mesh size of the screens is preferably smaller than 150 mesh.

The filter elements are constrained within a tube or duct which may be part of the device per se, or may be a portion of existing equipment modified to incorporate the filter elements of the invention. The filter devices or filter elements include electrical contacts which allow for current to flow across substantially all, and most preferably, all of the plane of the filter. A preferred arrangement of a filter device 1 is shown in FIG. 1, where the filter element 2 is brazed along its outer circumference to a conductive metal tube ("duct") 3, which is surrounded by a covering or "sheath" of thermal insulation 4. The conductive metal tube is attached to a source of electrical energy, for example alternating or direct current, here by direct current source 5, which is also attached to inner electrode 6. Inner electrode 6 is likewise brazed to the central portion of filter element 2. The central electrode may be a rod, optionally hollow (i.e. a tube). Current flows between inner electrode 6 and conductive metal tube 3, and the current resistively heats filter element 2. Gas flows through the device, and particulates are trapped by filter element 2. Pathogens are rendered non-viable by the heat of the filter element, and pathogens which pass through the filter element are rendered non-viable during passage through the element (i.e. by collision with the walls of the filter pores, and by hot air heated by the filter element). Small particulates in particular tend to diffuse to the hot ligaments of the filter pores.

Many variations of the device of FIG. 1 are possible. The insulation, in certain embodiments, can be dispensed with. The insulation serves to increase the thermal efficiency and maximize the temperature obtainable with a given configuration and electrical power level. The conductive metal tube may be replaced by a non-conductive tube having an inner conductive ring or contact where the filter element contacts its wall, e.g. a ring-shaped metal liner. The tube may be of ceramic material, for example, especially a ceramic material which has a fused (e.g. vitreous) inner surface and is otherwise porous, formed around a ring of metal to serve as the outer conductor. Such a porous ceramic material serves both as a thermal insulator and support.

The device need not be circular. Tubes or ducts of any cross-section may in principle be used, although many such cross-sections, i.e. square or rectangular, will likely exhibit non-uniform heating across the plane of the device. Suitable polymeric ducts, i.e. Teflon, polyamide, etc., may be also be used, so long as the material can withstand the heat generated by the filter element, either during routine operation, or during regeneration, when the latter is used. The electrode is described in this embodiment as "centrally located." However, the electrode may also be mounted off-center. By "centrally located" is meant that the electrode is mounted at a location within the outer periphery of the filter element when viewed in plan, as opposed to a location at a geometric center per se. More than one central electrode may be used, but such configurations are generally undesirable.

FIG. 2 illustrates a square cross-section filter element where no central electrode is employed. The filter element 11 of FIG. 2 is shown in greater detail in FIG. 2*b*, and consists of metal foam 12 brazed, welded, etc., to two parallel and oppositely disposed electrodes 13, 14. As shown in cross-section a—a of FIG. 2, and depicted in FIG. 2*a*, the filter element 11 is contained within an outer tube 16 of filter device 1, which surrounds the periphery of the filter element to provide a seal. Alternatively, the filter element may be sealed with a heat resistant grout or the like, in either case to prevent the existence of a particulate flow path around the filter element. Electrical connections 17, 18 contact respective electrodes 13, 14, and current flow is across the plane of the filter element. The tube, as discussed previously, may be molded high temperature polymer, ceramic material, etc. If insulation is provided between ends 19, 20 of the filter element and the corresponding walls of the tube, the tube may be made of metal.

A preferred circular cross-section filter device is shown in longitudinal cross-section in FIG. 3. In FIG. 3, a thermal insulating sleeve 30 surrounds conductive metal tube 31 to which are bonded with electrical continuity, e.g. by welding, brazing, etc., the peripheries of four metal foam filter elements 32, 33, 34 and 35, each in the form of a disk having a central hole, the inner peripheries of which are bonded with electrical continuity to central electrode 36.

The conductive metal tube 31 has a break 31*a* which provides for electrical discontinuity. Likewise, central electrode 36 has breaks 36*a* and 36*b*, also providing for electrical discontinuity in this element. For example, the central electrode may, in this case, be constructed of three pieces of non-adjoining metal tubing shrunk fit, adhesively bonded, etc., to a support such as a ceramic rod or tube, or a tube of thermally stable thermoset ore thermoplastic polymer, for example teflon, epoxy, etc., optionally fiber reinforced. The electrical discontinuities allow for a series electrical circuit among the filter elements, although parallel and series-parallel arrangements are also possible. The arrows in the foam elements, conductive tube, and central electrode indicate one possible direction of current flow.

The disk filter elements, in this preferred embodiment, are not planar with uniform thickness, but rather are conical on both sides. In this embodiment of filter elements 32, 33, 34 and 35, the electrical resistivity of radial segments progressing from the external periphery to the internal (hole) periphery is substantially constant, and thus more even heating across the filter elements is achieved. A power source is connected to elements 31 and 36, for example by insulated wire. Filters which are planar on one side and which taper in thickness on the other side will exhibit relatively constant resistivity as well. By "substantially constant" relative to resistance in this context is meant that the resistance of the filter element across a radial segment of radial thickness t, close to the central electrode, as compared to the resistance of the filter element across a radial segment of radial thickness $t_2$ closer to the outer conductive tube or duct will be closer to a ratio of 1:1 as compared to a filter element of uniform thickness.

Figure 4:
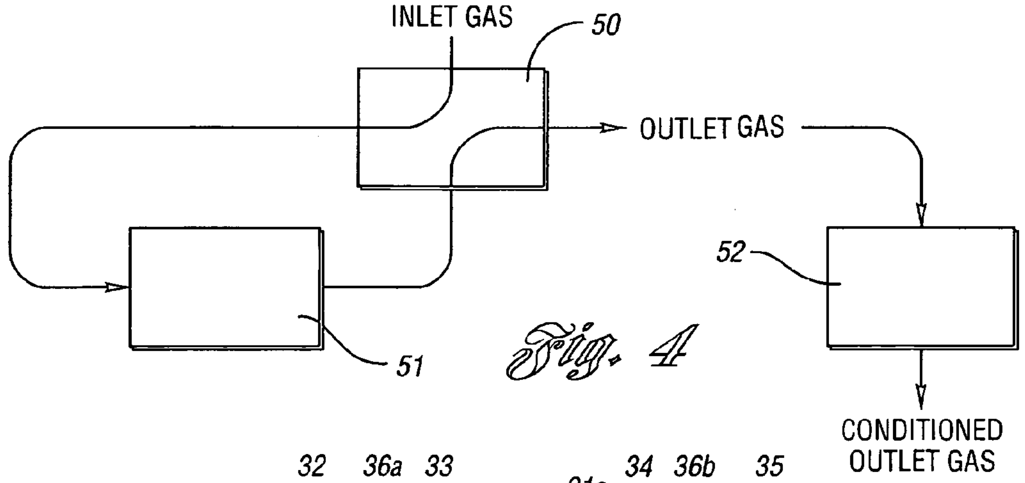
FIG. 4 illustrates a further embodiment of the present invention employing metal mesh screens as filter elements.

FIG. 4 illustrates a filter element 40 made of a plurality of metal screens 41, 43, 44, each having a central hole 45, and interleaving less conductive screens 46, 47, which are sandwiched together, and impregnated with a conductive substance, i.e. a metal alloy with a melting point lower than the metal of the metal screens, both along their periphery 48 and in the region of the central hole 49, these impregnated portions to serve as electrodes and attachment points for the external resistive heating power source. The screens 46, 47 may be made of glass fibers, quartz fibers, carbon fibers, etc., and need not have the same mesh size as the metal screens. The screens 46, 47, for example, may be woven fiberglass cloth or non-woven (i.e. felted) fiberglass, and serve to prevent additional conductive passages in the metal screens. Once the device reaches operating temperatures, the non-conductive (or relatively non-conductive) screens will rapidly be heated as well.

The use of a plurality of filter elements as disclosed in FIG. 3 has several advantages. First, with a given operating temperature of each element, a higher terminal gas temperature is achieved. Second, the probability of particulate impact and/or entrapment is markedly increased by the use of filter elements in series. As a result, the pore size of each filter element may be increased somewhat. Although an increase in pore size may be offset in part by an increase in back pressure caused by the presence of multiple filter elements, these effects are not completely offsetting, and thus an increase in flow rate with no decreased efficiency of pathogen destruction is possible.

The filter devices include means for providing electrical energy to the porous filter element such that current flow through the filter element per se heats the latter to the desired operating temperature. In some cases, additional conventional resistance heating wires or filaments may be included proximate the filter element to raise the temperature of the porous element to a degree where conductivity is within the range which is useful for resistance heating. Such a procedure may be necessary with certain cermet or ceramic filter elements where the resistance is too high at low temperatures for any significant current to flow, i.e. in the high megohm range, but which decreases to conventional electric resistance heating values at higher temperatures, for example but not by limitation, in the range of 400° C. to 800° C. Alternatively, for ceramic elements, a high initial electrical potential may be applied, and as the ceramic heats by conduction and its resistance lowers, the applied potential may be lowered as well. The applied voltage, in both this case as well as with metal foam and other heatable filter elements may be controlled by feedback from one or more thermocouples or other temperature measuring devices preferably placed appropriately within the device or in the exit air stream.

Electrical energy is transmitted through the filter element by conduction, and is supplied to the element by a low resistance, relatively large surface area electrode. The electrode generally cannot be a "point source" electrode, otherwise the conductive path through the device will approach a "line of sight" path, and significant portions of the filter element will not be heated, or will only be heated by thermal conductivity. Thus, in cylindrical filter devices as illustrated by FIGS. 1 and 3, the electrode preferably surrounds and contacts the entire periphery, and the center electrode preferably is surrounded by and contacts the entire periphery of the hole in the disk-shaped filter elements. In the device of FIG. 2, substantially the entire opposing edges of the filter element constitute high conductivity electrodes. These high conductivity electrodes can then be connected, i.e. by a single electrical cable, at but one point, their conductivity, cross-section, and contact area with the filter element assuring relatively constant conduction of electrical current between the electrodes across the filter element.

The source of electrical energy may be any convenient source, including direct current supplied by batteries, photovoltaic devices, generators, fuel cells, etc., or alternating current derived from such sources or from conventional alternators, etc. The voltage is selected so as to provide the desired current density, and thus heat output from the filter element.

The dimensions of a filter device, its flow rate, etc., are able to be predicted with reasonable certainty using standard computational methods of fluid dynamics. Moreover, since the devices are easily constructed, deviations from predicted performance are easily addressed.

In one method, the metal foam disk filter element is analyzed by viewing it as consisting of a series of ring segments, each ring segment having an inside and outside radius $r_i$ and $r_o$, respectively. In the metal foam disk, the electrical resistance in the radial direction of a ring cross-section with distance r from the center is designed as R.

$$R = \rho\frac{dr}{A} \tag{1}$$

where

ρ is the electrical resistivity of the metal foam

A=2πrw is the circumferential area of the ring.

Integrating for a ring of finite thickness from $r_i$ to $r_o$, the inner and outer radii of the ring, the electrical resistance of the ring $R_{ring}$ is derived.

$$R_{ring} = \int_{r_i}^{r_o} \rho\frac{dr}{2\pi rw} = \frac{\rho}{2\pi w}\ln\left(\frac{r_o}{r_i}\right) \tag{2}$$

Since the ring segment is usually very thin, the area A of ring segment can be approximated by $\pi(r_o+r_i)w$ and the $R_{ring}$ can be expressed as:

$$R_{ring} = \int_{r_i}^{r_o} \rho\frac{dr}{\pi(r_o+r_i)w} = \frac{\rho(r_o-r_i)}{\pi w(r_o+r_i)} \tag{3}$$

The summation of electrical resistance of ring segments making up the metal foam disk is the electrical resistance of the disk, $R_{disk}$, in the radial direction.

$$R_{disk}=\Sigma R_{ring} \tag{4}$$

It is noted that, for a ring with the same width, the ring with larger radius on the outside of the disk has a smaller electrical resistance due to the increase in cross-sectional area for the electrical current flow. It is expected that more resistance heating and higher air temperature will therefore be generated in the inside ring segments.

The total heat generated in the disk by electric resistance heating, $Q_{disk}$, is calculated by:

$$Q_{disk}=i^2 R_{disk} \tag{5}$$

Part of the heat generated is lost through the insulation to the ambient environment. For cylindrical 1-D conduction, this heat loss, $Q_{loss}$, is given by F. Incropera, et al., INTRODUCTION TO HEAT TRANSFER, Wiley, N.Y. (2002):

$$Q_{loss} = \frac{2\pi(T_b - T_\infty)kl}{\ln\left(\frac{(r_{ins} + t_{ins})}{r_{ins}}\right)} \quad (6)$$

where $T_b$ is the temperature of the tube, $T_\infty$ is the ambient temperature, k is the thermal conductivity of the insulation, l is the length of the cylinder, $r_{ins}$ is the inner radius of the insulation, and $t_{ins}$ is the thickness of the insulation. The tube has a thin wall thickness, relative to the inside diameter, and is made of high thermal conductivity material. In the cross-section perpendicular to the tube center axis, temperatures at inside and outside diameter of the tube are assumed to be the same.

The bulk temperature increase, ΔT, in the air flow across the metal foam heating disk can be estimated by:

$$\Delta T = \frac{Q_{disk} - Q_{loss}}{\dot{m}C_p} \quad (7)$$

where $\dot{m}$ is the mass flow rate and $C_p$ is the specific heat of the air.

An example is given here of a Fe—Cr—Al foam disk of w=13 mm, inner diameter d=6.35 mm to fit the inner rod, and outside diameter D=50.8 mm to fit inside a tube. The Fe—Cr—Al foam is brazed to the copper tube and rod. The braze paste consists of, by weight, 5 parts BNi-6 braze powder, 1 part nickel metal powder, and 1 part Kelzan (xanthum gum) binder. The BNi-6 braze, composed of Ni with 11% P and 0.1% C, is chosen because it flows freely around the joint, binds well to Fe—Cr—Al alloy, and is suitable for use at elevated temperatures. However, other methods of attachment are clearly possible, including welding, or even pressure contact. During assembly, Ni wool is used to tighten the fit between the metal foam and the inner rod and outer tube. Dummy foam elements are inserted into the ends of the prototypes without braze paste to support the rod during the handling and firing. The green prototypes are fired in a vacuum furnace using the cycle shown in Table 2, although other brazing cycles may be used as well.

TABLE 2

| Segment | Ramp Rate (° C./min) | Set Point (° C.) | Soak Time (min) |
|---|---|---|---|
| 1 | 8 | 121 | 10 |
| 2 | 6 | 943 | 5 |
| 3 | 1.5 | 971 | 30 |
| 4 | Max | 871 | 5 |
| 5 | — | Room Temp | 25 |

The measured electrical resistivity of 5 wt %, 100 ppi foam is 99.6 μΩm. As shown in Table 3, the disk is divided into seven ring segments, each ring having radial dimension of 6.35 mm. Using Equation (2), the innermost ring with $r_i$=3.18 mm and $r_o$=6.35 mm has an electrical resistance of 845 μΩ. For the same ring, using Equation (3), a resistance of 813 μΩ is calculated. In comparison, the outermost ring with $r_i$=22.23 mm and $r_o$=25.40 mm, the electrical resistance calculated using both Equations (2) and (3) is the same, 163 μΩ. This value is significantly lower than that of the innermost ring. For the entire heating disk, summing the electrical resistance of seven ring segments yields a total electrical resistance of 2.54 mΩ using Equation (2) and 2.49 mΩ using Equation (3). For an electrical current i=50 A, about 6.23 W of heat is generated in the disk Fe—Cr—Al metal foam element. Assuming under the atmospheric pressure and a temperature of 27° C. and the air flow rate of 4 L/min, which correspond to an $\dot{m}$ of $7.74\times10^{-5}$ kg/s, and $C_p$ of 1007 J/kgK, F. Incropera, et al., INTRODUCTION TO HEAT TRANSFER, Wiley, N.Y. (2002), the temperature rise of the air, ΔT, is 79.9° C. based on Equation (7). The outlet temperature, therefore, is predicted to be 107° C. This is assuming the adiabatic boundary condition on the outer tube surface, i.e. $Q_{loss}$, =0.

TABLE 3

| Ring | $r_i$ (mm) | $r_o$ (mm) | Electrical resistance (μΩ) [from Eq. (2)] | Electrical resistance (μΩ) [from Eq. (3)] | Heat generation rate (kW/m³)* |
|---|---|---|---|---|---|
| 1 | 3.18 | 6.35 | 845 | 813 | 1650 |
| 2 | 6.35 | 9.53 | 495 | 488 | 590 |
| 3 | 9.53 | 12.70 | 351 | 349 | 300 |
| 4 | 12.70 | 15.88 | 272 | 271 | 180 |
| 5 | 15.88 | 19.05 | 222 | 222 | 120 |
| 6 | 19.05 | 22.23 | 188 | 188 | 88 |
| 7 | 22.23 | 25.40 | 163 | 163 | 66 |

*Based on i = 50 A and electrical resistance from Equation (3).

This temperature rise represents an ideal case of all electrical heat converts to thermal heat and all carries away by the air without any loss, i.e. the outer tube is adiabatic and no heat transfer to the inner rod. In real tests, some of the heat generated by the metal foam heater will be transferred through the outer tube and insulation as well as through the inner rod to the surroundings. According to the manufacturer, the thermal conductivity of the fiberglass insulation k is about 0.043 W/m-K. Assuming $r_{ins}$=25.4 mm and $t_{ins}$=19 mm (used in the experiment) and $T_b$=107° C., $T_\infty$=27° C., and l=380 mm (the entire length of the heater pipe used in the experiment), the $Q_{loss}$=15.5 W. This is higher than the 6.23 W generated by the metal foam heating element, thus it is not possible. By reducing l to 39 mm (three times the width of the metal foam) and keeping all the other variables the same, the $Q_{loss}$ is 1.6 W. Under such $Q_{loss}$ and using Equation (7), the bulk temperature increase in the air flow across the metal foam heating disk is 59.5° C. More efficient insulation will lower heat loss.

This example shows that using the analytical model to accurate predict the heat loss and temperature rise is not always totally accurate. More detailed computational thermal-fluid modeling and metal foam heater experiments may be used to more accurately predict the performance of metal foam electrical heaters. These two approaches are discussed in more detail below.

The FLUENT computational fluid dynamics (CFD) software v.6.0 is used for more detailed modeling of the metal foam heater. The example analyzed above using the 50.8 mm outside diameter, 6.35 mm inside diameter, 13 mm thick, and 100 ppi, 5 wt % Fe—Cr—Al foam heating element under 50 A electrical current and 4 L/min air flow rate is modeled for mutual comparison. Using the GAMBIT preprocessor, a model consisting of seven concentric rings listed in Table 3 is created to represent the metal foam. Circular cross-sections of the inlet and outlet with 50.8 mm outside diameter are also created to define a cylindrical shape control volume with the heating element inside. The 50.8 mm diameter outer surfaces (tube inside walls) are specified as walls, meaning that air cannot flow through them. The distance from the inlet and outlet cross-sectional surfaces to the metal foam is 100 mm. This length is long enough to allow close to the steady-state flow and temperature distributions to develop. The total length of the cylindrical control volume including inlet, foam, and outlet is 213 mm. It is noted that the inner rod is not included in the model of the inlet and outlet regions.

Figure 6:
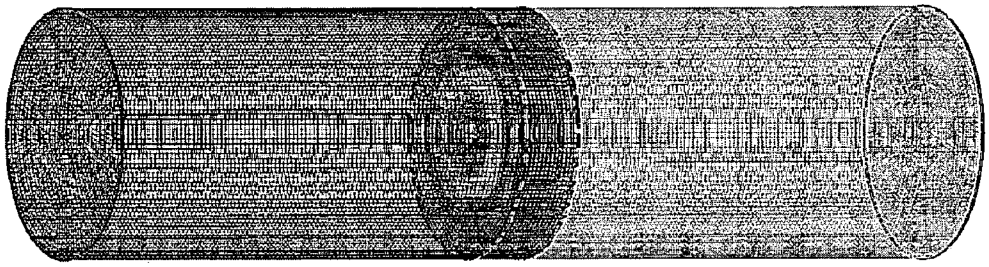
FIG. 6 illustrates on analytical mesh which may be used with computer modeling to predict filter device performance.

FIG. 6 shows the "mesh" used in the analysis. The heating element is broken into seven concentric cylindrical rings, each with a uniform heat generation rate, as listed in Table 3. Meshing is done by first paving the inlet cross-section surface of the heating element, and then expanding to a volume mesh using a Cooper mesh scheme, T. Blacker, "The Cooper tool," $5^{th}$ *International Meshing Roundtable,* Sandia National Laboratories, pp. 13–30 (1996). Inlet and outlet zones are then meshed using the same manner, with the heating elements surface serving as the source for mesh generation. After meshing, properties of each surface and volume of the model are assigned. Porosity is assigned to the foam sections in the FLUENT solver.

The outlet air is assumed to be under uniform constant atmospheric pressure, since the heater outlet is open to ambient room conditions. This inlet cross-section is specified with a uniform velocity, $V_{in}$, which can be varied to correspond with the different flow rates by assuming uniform flow.

Three parameters, viscous resistance ($R_{visc}$), inertial resistance ($R_{iner}$), and porosity, are required in FLUENT to specify for the porous region for the metal foam heater. The viscous and inertial resistances for the metal foam with air as the working fluid have been tested at Porvair, D. Floyd, *Fluid Properties of Open Cell Sintered Iron Based Porous Metal Structures, Experimental Results and Discussion,* Porvair Fuel Cell Technical Report (2001).

$$R_{visc}=745400\rho_w^{2.06}e^{0.0364p^{0.063}} \quad (8)$$

$$R_{iner}=7.44\rho_w^{2.06}p^{0.63} \quad (9)$$

where $\rho_w$ is the percentage of weight density and p is the porosity of the foam in pores per inch (ppi).

The outer wall of the heater was modeled as adiabatic insulation (zero heat flux). Experimental results of temperature profiles for the 100 ppi, 5 wt % Fe—Cr—Al metal foam under 50 A electrical current heating, and 4 L/min air flow rate are measured. In the inlet, the temperature is uniform at 27° C. In the metal foam, due to the higher electrical resistance and heater generation rate for inner ring segments, a temperature in the 114 to 124° C. range is predicted. On the outside rings of the foam disk, the temperature drops to about 75 to 85° C. In the exit surface of the outlet section, the air temperature ranging from 90° C. near the outside tube to 100° C. near the center axis is recorded. This value is slightly lower than the 107° C. of the uniform outlet temperature estimated in the analytical model. The error is possibly caused by the viscous and inertial resistance modeling in the flow model in Equations (8) and (9), but is reasonably close.

Cross-sections of the temperature contours at a distance of 12.5 mm and 25.4 mm from the edge of the metal foam heater were also measured. For the cross-section close to the metal foam, a high temperature gradient with 118° C. in the center to 75° C. near the outside tube can be seen. The fluid mixes and heat is transferred during the next 12.5 mm of travel, and a more uniform temperature distribution with 112° C. in the center and 69° C. near the outer tube can be observed.

By changing the boundary condition of the outer wall tube in the FLUENT modeling from adiabatic to radiation to 300 K surroundings, the outlet air temperature at the cross-section 25.4 mm from the edge of the metal foam is reduced to a range of 100 to 49° C. At the exit surface in the outlet, an average temperature rise of only 40° C. is estimated. This indicates that a significant $Q_{loss}$ occurs in this design. Experimental measurements verify this observation.

The filter devices of the present invention are particularly well suited to air filtration applications where pathogens or thermally denaturable bioactive molecules are present. The internal temperature is adjusted by the number of filter elements and current flow through the elements (which may be adjusted separately in suitable configurations), so as to destroy pathogens or denaturable molecules such as peptides, oligopeptides, proteins, etc. However, the filter devices are also useful for routine filtration, either heated or non-heated, where combustible or otherwise thermally labile particulates are to be filtered from a gas stream.

Thus, for example, the filter devices may be employed in parallel in the exhaust stream of a diesel engine to trap hydrocarbon particles and particularly carbonaceous emissions. In such an embodiment, one filter device may be connected to the exhaust stream, while a second filter device is isolated and regenerated by increasing its temperature to such a degree that volatizable and combustible trapped particulates are burned and/or driven off. Regeneration in such cases preferably is assisted by a flow of air or oxygen for combustion, although in chemical processes, for example, combustion may not be necessary or desirable.

Figure 5:
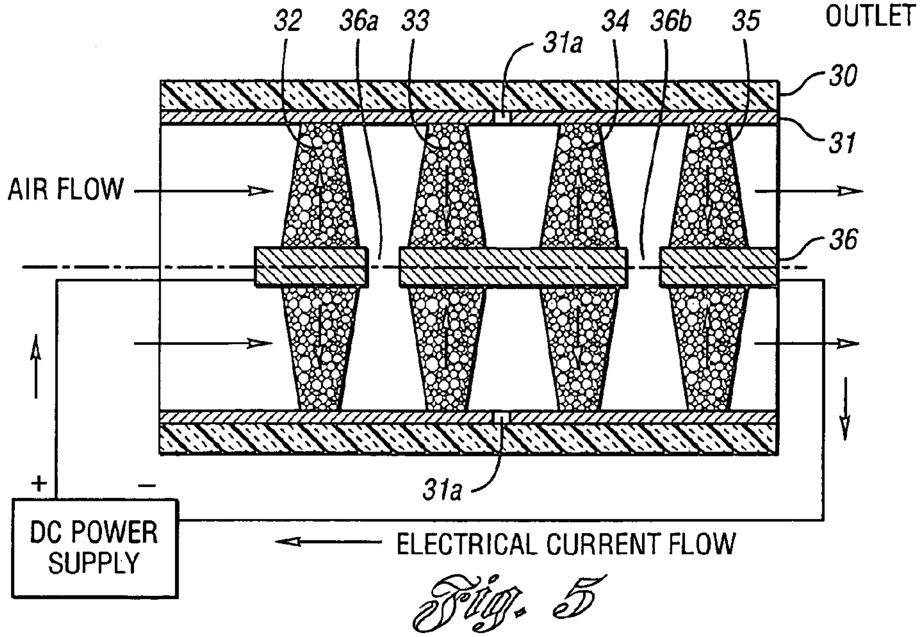
FIG. 5 illustrates an embodiment where efficiency is improved by way of a heat exchanger.

In a preferred embodiment as shown in FIG. 5, inlet gas may flow through heat exchanger 50 and from there into filter device 51, while the heated gas from filter device 51 also flows through heat exchanger 50, heating the inlet gas in the process. If the outlet gas is not reduced sufficiently in temperature, it may flow through chiller or air conditioning unit 52 to provide "conditioned" outlet gas. The heat exchanger may be a conventional exchanger such as a plate-plate, tube-in-vessel, or other commonly used exchanger.

Having generally described this invention, a further understanding can be obtained by reference to certain specific examples which are provided herein for purposes of illustration only and are not intended to be limiting unless otherwise specified.

The experimental metal foam heaters use a standard copper tube of 50.8 mm inside diameter and 1.5 mm wall thickness and a copper rod (central electrode) of 6.35 mm outside diameter. The width of the metal foam (w) is 13 mm. These dimensions match those used in the analytical and numerical modeling. The total tube length is 380 mm, with the metal foam located in the center. Outside the tube, a layer of 19 mm thick fiberglass thermal insulation is used.

Four heating elements are made of Fe—Cr—Al metal foam with 80 and 100 ppi porosity and 5 and 15% weight density. These metal foam heating elements are brazed to the copper tube and rod as previously described to make four heating devices for experimental testing.

Figure 7A:
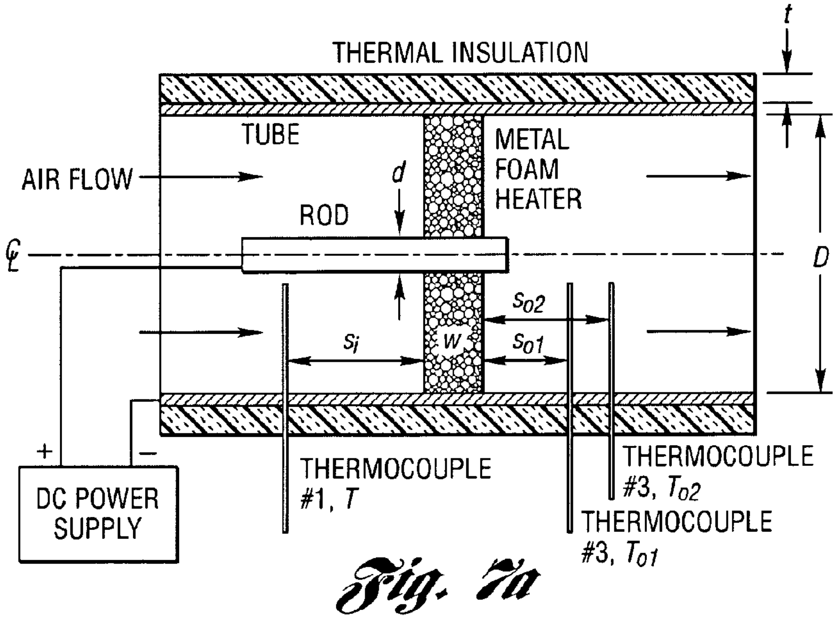
FIGS. 7*a* and 7*b* illustrate cross-section and axial views of a test configuration which may be used to assess device performance.
Figure 7B:
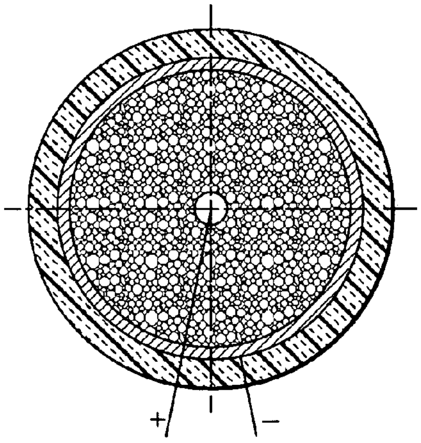

The test configuration is shown in FIG. 7. A flow meter, Brooks Instrument 5850E, is used to control the volume of air flow rate through the metal foam heating element. A DC power supply is used to generate the desired DC current through the heating element.

Two sets of experiments are conducted. One is a 5 hour long-duration test using the 5 wt %, 100 ppi metal foam heater to study its characteristics for an extended period of time and to evaluate the time required to reach the steady-state heating condition. Another is a set of tests conducted on the four metal foam heaters. For each metal foam heater, four levels of air flow rate at 0.5, 1.0, 2.0, and 4.0 L/min and three levels of electrical current at 30, 40, and 50 A are tested. In total, 48 (=4×4×3) experiments are conducted.

The ambient, inlet, and averaged outlet temperatures are recorded during all tests. As shown in FIG. 7, one inlet air temperature ($T_{in}$), two outlet air temperatures ($T_{01}$ and $T_{02}$), and ambient room temperature ($T_\infty$) are recorded using type K thermocouples. The distances $s_i$, $s_{o1}$, and $s_{02}$ are 200 mm, 13 mm, and 25 mm, respectively. The average of two outlet temperatures $T_{o1}$ and $T_{o2}$ is used to represent the average outlet air temperature, $T_o$. The averaging is done in real-time by the data-acquisition equipment.

Figure 8:
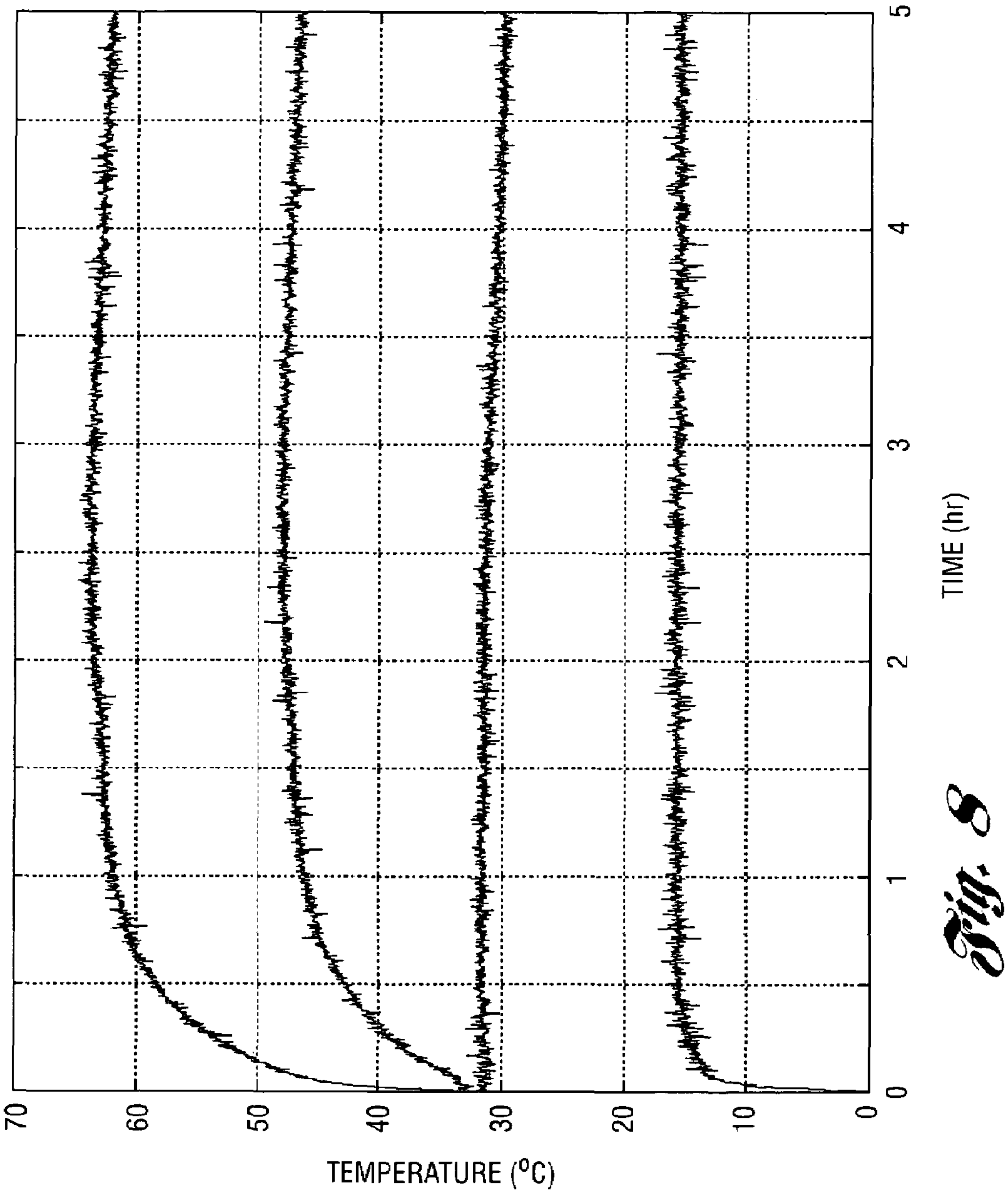
FIG. 8 illustrates various temperatures achieved with a single heated filter element in a device in accordance with the invention, over 5 hours.

FIG. 8 shows the inlet, ambient, and averaged outlet air temperatures over 5 hours. The ambient temperature starts at about 32° C. and gradually drops to 29° C. after 5 hours. The test is conducted in a shop floor environment without precise temperature control, which results in such temperature fluctuation. The inlet temperature, $T_i$, gradually increases from the ambient 32° C. to about 47° C. after 3 hours of testing. The gradual increase in $T_i$ is due to the heat conducted from the outer tube and inner rod to the front end of the heating device that pre-heats the inlet air. Following the trend of ambient temperature, $T_o$ also gradually increases to about 64° C. after 3 hours. The difference of outlet and inlet temperature, ΔT, is also plotted in FIG. 8. The temperature rise reaches the steady-state condition of about 16° C. after about 20 to 30 min.

Figure 9A:
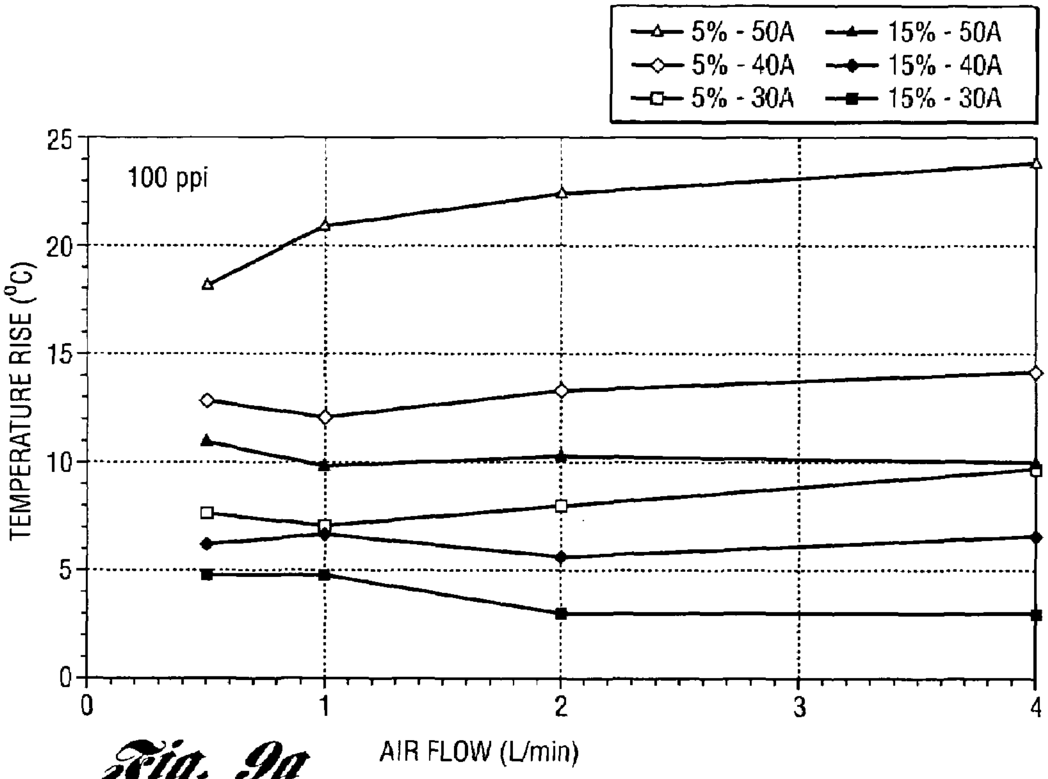
FIGS. 9*a* and 9*b* illustrate various temperatures achieved as in FIG. 8, but over a 48 hour period, with 100 ppi (FIG. 9*a*) and 80 ppi (FIG. 9*b*) filter elements.
Figure 9B:
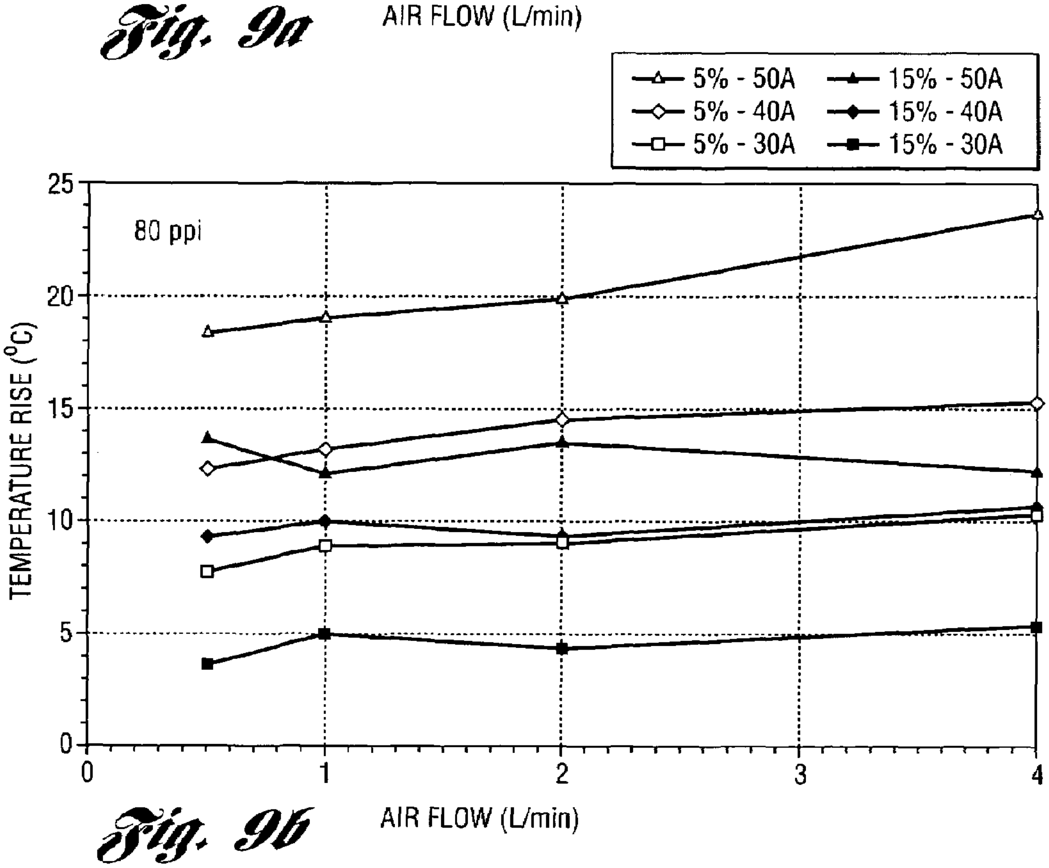

Results of the temperature rise ($\Delta T = T_o - T_\infty$) of the 48 test conditions using 4 metal foam heating elements at 4 levels of air flow rate and 3 levels of electrical current flow after 20 min of heating are shown in FIG. 9. The effects of electrical current, air flow rate, metal foam porosity (pore size), and wt % are shown.

The effect of electrical current on outlet temperature is as expected: when more electrical current is supplied to the meal foam heater, more heat is generated, and the temperature rise is greater. The effect of the air flow rate on temperature rise is not as obvious. As the air flow rate increases, the residence time of the air through the heater is likewise decreased, which would lead to lower outlet temperatures. At the same time, however, the convective heat transfer coefficient increases, which would lead to more heat gain and higher temperatures, V. V. Calmidi, et al., "Forced convection in high porosity metal foams," Journal of Heat Transfer, Vol. 122, pp. 557–565 (2000); J. J. Hwang, et al., "Measurement of interstitial convective heat transfer and frictional drag for flow across metal foams," Journal of Heat Transfer, Vol. 124, pp. 120–129 (2002). Balance of the short residence time and high thermal convection can be seen in FIG. 9. The effect of air flow rate on temperature rise is not as clear except for the 5 wt % foam at 50 A. Under such condition, more heat can be transferred to the air flow from the metal foam heating device. More prominent temperature rise at higher air flow rates can be observed.

The effect of the weight density of the metal foam on the temperature rise is clear. The higher wt % foam has more metal and lower electrical resistivity. During electrical heating, less heat is generated at the same current level and the temperature rise is lower. FIG. 9 indicates that 15 wt % metal foam heaters generate significantly less temperature rise than the 5 wt % metal foam heaters under the same testing conditions.

The porosity of the metal foam changes the electrical resistivity and the temperature rise. For the 5 wt % metal foam, as shown in Table 1, the change in porosity does not change much of the electrical resistance. The temperature rise of the 80 and 100 ppi metal foam heaters with 5 wt % density are about the same. For the 15 wt % Fe—Cr—Al metal foam, as shown in Table 1, the 80 ppi porosity metal foam has higher electrical resistance, which results in the greater temperature rise than the 100 ppi heater under the same testing condition.

Compared to the computational fluid dynamics model prediction of 40° C. temperature rise; the experimental measurement of the steady-state temperature rise for the same 5 wt %, 100 ppi metal foam heater show about 33° C., which is reasonably good agreement considering the complicated nature of the system. Compared to the analytical modeling with adiabatic boundary condition on the tube, the 80° C. temperature rise is much higher than the experimental measurement. This indicates that a significant portion of the heat is lost through the tube to the surroundings.

It is possible to increase the resistance of the heating element by reducing its thickness. Reducing the thickness of the metal foam will increase the electrical resistance and raise the temperature of the metal foam. However, under a constant flow rate, residence time of the air in the foam is shortened. This could possibly reduce the heat transferred to the air. If thickness is decreased with increasing radius, a more uniform heat generation rate can be created. The variable thickness design of the metal foam disk is illustrated in FIG. 3. The width $w_i$ of the metal foam disk in contact with the inner rod is wider than the width $w_o$ on the outside of the disk. Turning the metal foam disk in a lathe is difficult. The cylindrical wire EDM process, as presented by J. Qu, et al., "Development of the Cylindrical Wire Electrical Discharge Machining Process: Part I: Concept, Design, and Material Removal Rate," ASME Journal of Manufacturing Science and Engineering, Vol. 124, No. 3, pp. 702–707 (2002), can be applied to manufacture the metal foam heater of such unique geometry, or of other geometries as well. Filter elements can also be constructed at net shape.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A filter device for inactivation of pathogens from an air stream, comprising:

a) a duct for conveying an inlet air stream b) positioned in said duct across the flow of gas, at least one electrically resistively heatable porous and conductive filter element, c) means for providing electrical energy to said porous and conductive filter element for resistively heating said porous and conductive filter element, wherein said porous and conductive filter element comprises a sintered metal or metal foam element having a front surface facing the inlet air stream and a back surface facing away from the inlet air stream, the filter element having a thickness contour between said front surface and said back surface such that the electrical current distribution over cross-sections of the filter element perpendicular to the direction of current flow is substantially constant, such that a substantially constant temperature is maintained across the filter element.

2. The filter device of claim 1, wherein an interior of said duct electrically conductive, a periphery of a porous conductive filter element is bonded with electrical continuity to said electrically conductive interior of said duct, and a central portion of said porous conductive filter element is bonded with electrical continuity to a conductive electrode positioned within said duct.

3. The filter device of claim 2, wherein said duct comprises a metal tube, and said electrode comprises a metal, optionally hollow rod, an outer periphery of said porous conductive filter element bonded with electrical continuity to said tube, and an inner periphery of a hole within said filter element bonded with electrical continuity to said metal rod.

4. A filter device suitable for removing particulates from a gas stream, comprising:

a) a duct for conveying a gas stream;

b) positioned in said duct across the flow of gas, at least one electrically resistively heatable porous and conductive filter element, c) means for providing electrical energy to said porous and conductive filter element for resistively heating said porous and conductive filter element, wherein said filter element contains a first metal electrode or is bonded with electrical continuity to a first metal electrode to provide a contact area between said filter element and a first electrode and to a second electrode, said filter element providing a conductive path between said first and second electrodes, and wherein the line of electrical contact between said filter element and said first electrode is greater in plan than the line of contact of said filter element and said second electrode, and wherein the thickness of said filter element increases from its thickness at said first electrode to a greater thickness at said second electrode.

5. A filter device suitable for removing particulates from a gas stream, comprising:

a) a duct for conveying a gas stream;

b) positioned in said duct across the flow of gas, at least one electrically resistively heatable porous and conductive filter element, c) means for providing electrical energy to said porous and conductive filter element for resistively heating said porous and conductive filter element, wherein said filter element contains a first metal electrode or is bonded with electrical continuity to a first metal electrode to provide a contact area between said filter element and a first electrode and to a second electrode, said filter element providing a conductive path between said first and second electrodes, and wherein the line of electrical contact between said filter element and said first electrode is greater in plan than the line of contact of said filter element and said second electrode, wherein said filter element has a circular cross-section and a thickness in a direction orthogonal to said circular cross-section, an outer periphery bonded to a first electrode, and a centrally located hole bonded to a centrally located second electrode, and wherein the thickness of said filter element increases from its thickness at said first electrode to a greater thickness at said second electrode.

6. A process for the filtration of a gas stream comprising thermally deactivatable particulates, comprising:

a) providing a filter device of claim 1, and b1) heating one or more of said at least one filter element(s) of said filter device by passing an electric current through said one or more filter elements to provide one or more heated filter elements, and c1) passing said gas through said one or more heated filter elements; and/or b2) passing said gas through said one or more filter elements of said filter device, thereby trapping particulate s on one or more filter elements, and c2) heating at least one of said one or more filter elements to a high temperature sufficient to destroy particulates trapped thereon or to render pathogens trapped thereon non-viable, and d) obtaining from an exit of said filter device a gas stream depleted of particulates and/or viable pathogens.

7. The process of claim 6, wherein said filter device is employed to filter a stream of gas containing or potentially containing at least one pathogenic microorganism, and wherein at least one filter element is resistively heated to a temperature such that the microorganisms are rendered non-viable.

8. The process of claim 7, wherein said microorganism is one or more selected from the group consisting of those causing the symptoms of anthrax, SARS, tuberculosis, smallpox, pneumonia and ebola.

9. The process of claim 7, wherein heated gas exiting said filter device is routed through a heat exchanger and a gas stream to be passed through said filter device is also routed through said heat exchanger, said gas stream being heated and said heated gas being cooled by transfer of heat in said heat exchanger.

10. The device of claim 1, wherein the filter elements are planar rectangular elements having electrical contacts along two opposing edges of the rectangular elements.

11. The device of claim 1, wherein the filter elements are hollow disks having a central hole and an inner and an outer periphery, one electrical contact along the inner periphery of the hole of the element, and a second electrode along the outer periphery, the thickness of the element decreasing from the thickness at the inner periphery to the outer periphery.

12. The device of claim 1, wherein the filter element comprises a metal foam.

13. The device of claim 10, wherein the filter element comprises a metal foam.

14. The device of claim 11, wherein the filter element comprises a metal foam.

15. The process of claim 6, wherein the filter element temperature is maintained between 60° C. and 200° C.

16. The process of claim 6, wherein the filter element temperature is maintained between 100° C. and 1500° C.

* * * * *

UNITED STATES PATENT AND TRADEMARK OFFICE

CERTIFICATE OF CORRECTION

PATENT NO. : 7,083,663 B2
APPLICATION NO. : 10/696790
DATED : August 1, 2006
INVENTOR(S) : Albert J. Shih et al.

It is certified that error appears in the above-identified patent and that said Letters Patent is hereby corrected as shown below:

Column 16, Line 12, Claim 6:

Delete “participate  s” and insert therefor -- particulates --.

Signed and Sealed this

Fourteenth Day of November, 2006

JON W. DUDAS

*Director of the United States Patent and Trademark Office*